Patented Aug. 24, 1937

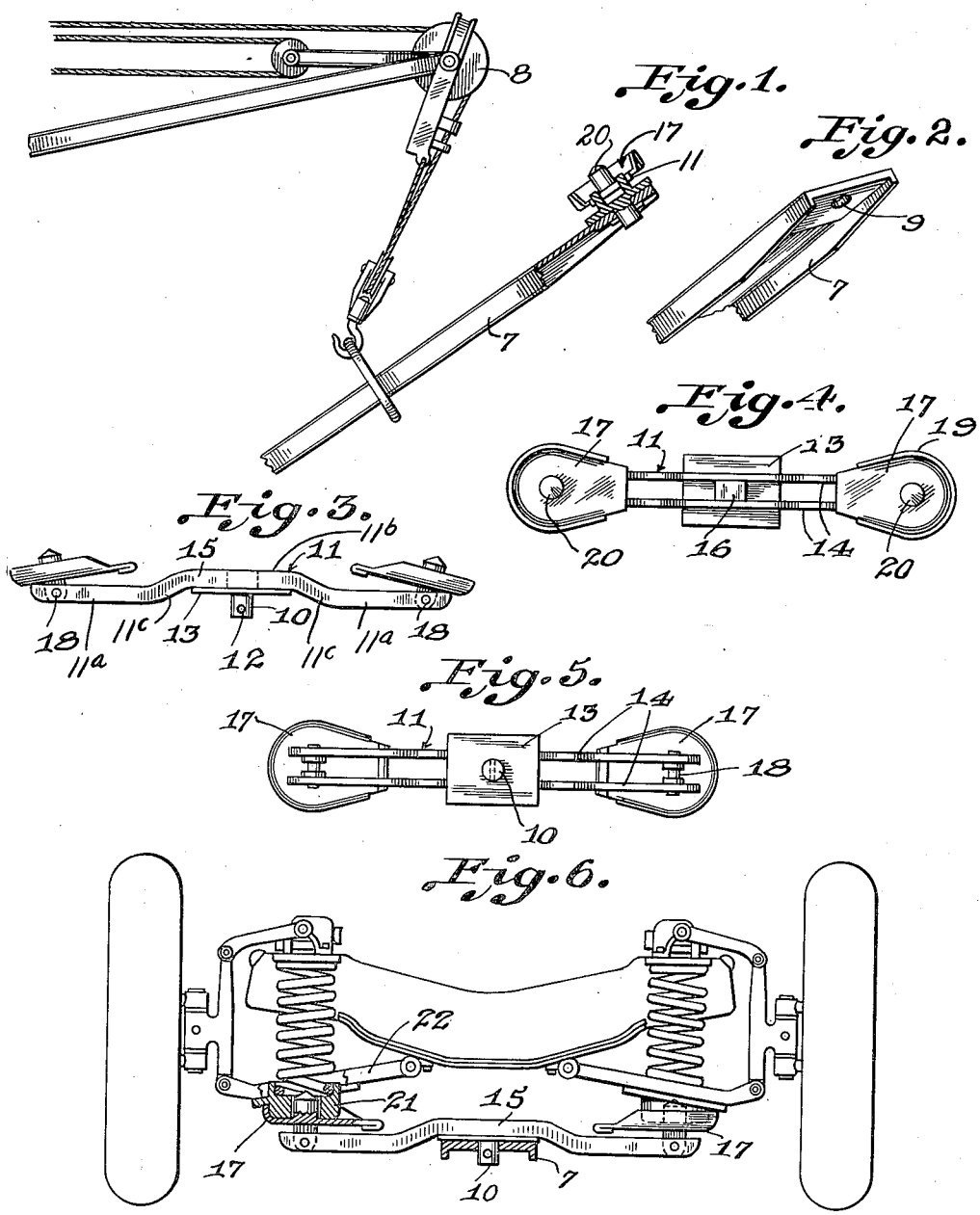

2,090,819

UNITED STATES PATENT OFFICE 2,090,819

TOWING EQUIPMENT

Guy S. Thompson, Washington, D. C., assignor of one-third to Robert E. Barry and one-third to Wilbur M. Sanders, both of Washington, D. C.

Application December 11, 1936, Serial No. 115,417

4 Claims. (Cl. 214—86)

This invention relates to improvements in towing equipment and more especially to a novel saddle to be arranged at the rear of a towing car boom for the purpose of raising the front end of a knee-action automobile.

The primary object of the invention is to provide a saddle of special construction having pivotally mounted spring seats to engage the lower spring levers of a knee-action car.

A further object is to provide a saddle to accommodate the front end of a knee-action motor vehicle.

With the foregoing objects outlined and with other objects in view which will appear as the description proceeds, the invention consists in the novel features hereinafter described in detail, illustrated in the accompanying drawing and more particularly pointed out in the appended claims.

In the drawing:

Fig. 1 is the rear end portion of the lifting mechanism of a towing car with my improved saddle in place thereon and shown in vertical section.

Fig. 2 is a perspective view of the rear end of the boom of the towing car.

Fig. 3 is a front elevation of the improved saddle.

Fig. 4 is a top plan view of the same.

Fig. 5 is a bottom plan.

Fig. 6 is a front elevation of the front portion of a knee-action automobile with my improved saddle shown engaging the lower spring levers of the car, a portion of the saddle being shown in vertical section.

Referring to the drawing, 7 designates the rear end portion of the boom of the towing car which is swung upwardly by conventional lifting means generally designated 8. The boom is provided at its rear end with a vertical bearing 9 to receive a king pin 10 depending from the frame 11 of the saddle. The king pin has a hole 12 for the reception of a cotter pin or the like used in pivotally securing the saddle to the boom.

The frame consists of a bearing plate 13 which is fixedly secured by any suitable means to a pair of strips or rods 14 of special shape. Each rod has a raised central portion 15, and between these raised portions there is a block 16 forming part of the means for fixedly securing the rods or bars to the bearing plate 13.

Seating members 17 are pivotally mounted at the outer ends of the frame by means of pivot pins 18 or the like. Each of the members 17 has an upstanding substantially U-shaped wall 19, and a pin 20 projects upwardly from the central portion of each seating member; these pins being designed to enter the spring seats 21 on the lower levers 22 of a knee-action car as shown in Fig. 6.

From Fig. 3, it will be noted that the end portions 11a of the cross frame 11 are arranged at a lower elevation than the medial portion 11b of said frame, and that the intermediate portions 11c incline downwardly and outwardly from the medial portion 11b toward the end portions 11a. Consequently, the portions 11c form abutments which will be engaged by the opposite side edges of the boom 7 to limit swinging movement of the cross frame relative to the boom.

In using the equipment the rear end of the boom with the special saddle thereon is raised upwardly from a position below the front axle of the automobile and at this time the pins 20 will not only enter the apertures in the seats 21 but the upstanding walls 19 will serve to guide the members 17 into engagement with the spring seats 21. Obviously, when the parts are in the position shown in Fig. 6, and the boom is raised to a higher position the saddle will serve to prevent the front portion of the towed automobile from falling off of the boom.

It may be seen from Figs. 1, 2, and 6, that the upper surface of the rear end portion of the boom 7 forms a relatively broad bearing surface having the aperture 9 in the central portion thereof, and the plate 13 of the cross frame also has a relatively broad bottom surface resting on the bearing surface of the boom. Consequently, the structure is such as to minimize any rocking of the cross frame on the boom either longitudinally or transversely thereof.

While I have disclosed what I now consider to be a preferred embodiment of the invention, I am aware that changes may be made in the details disclosed without departing from the spirit of the invention as expressed in the claims.

What I claim and desire to secure by Letters Patent is:

1. Towing equipment for a knee-action automobile of the type having knee-action spring seats arranged beneath its front axle, comprising a vertically swinging boom, a cross frame having its medial portion resting on the rear end portion of the boom, means pivotally connecting the cross frame to the rear end portion of the boom to allow the cross frame to swing in a substantially horizontal plane when the rear end portion of the boom is in a substantially horizontal plane, but restraining the cross frame from rocking in any vertical plane, and seating members pivotally connected to the end portion of the cross frame for swinging movement in a substantially vertical plane when the rear end portion of the boom is in a substantially horizontal position, each of said seating members having an upstanding marginal wall forming means for preventing a spring seat of the automobile from falling off the seating member.

2. Towing equipment for a knee-action automobile of the type having knee-action spring seats arranged beneath its front axle, comprising a vertically swinging boom, a cross frame having its medial portion resting on the rear end portion of the boom, means pivotally connecting the cross frame to the rear end portion of the boom to allow the cross frame to swing in a substantially horizontal plane when the rear end portion of the boom is in a substantially horizontal plane, but restraining the cross frame from rocking in any vertical plane, and seating members pivotally connected to the end portion of the cross frame for swinging movement in a substantially vertical plane when the rear end portion of the boom is in a substantially horizontal position, each of said seating members having an upstanding marginal wall forming means for preventing a spring seat of the automobile from falling off the seating member, each seating member also having a centrally disposed upstanding pin to enter a spring seat of the automobile.

3. Towing equipment for a knee-action automobile of the type having knee-action spring seats arranged beneath its front axle, comprising a vertically swinging boom, a cross frame having its medial portion resting on the rear end portion of the boom, means pivotally connecting the cross frame to the boom to permit the cross frame to swing in the plane of the rear end portion of the boom but preventing the cross frame from rocking in any substantially vertical plane relatively to the rear end portion of the boom, the cross frame having its medial portion at a higher elevation than its end portions, the intermediate portions of the cross frame between its medial portion and its end portions forming abutments cooperating with the rear end portion of the boom to limit swinging movement of the cross frame relatively to the boom, and seating members pivotally mounted on the end portions of the cross frame for movement in a substantially vertical plane when the rear end portion of the boom is in a substantially horizontal position, each seating member having an upstanding marginal wall forming means for preventing a spring seat of an automobile from falling off the seating member.

4. Towing equipment for a knee-action automobile of the type having knee-action spring seats arranged beneath its front axle, comprising a vertically swinging boom having a relatively broad bearing surface at the top of its rear end portion, a cross frame having a relatively broad bearing surface on the bottom of its medial portion resting on said bearing surface of the boom, means pivotally connecting the cross frame to the rear end portion of the boom to allow the cross frame to swing in a substantially horizontal plane when the rear end portion of the boom is in a substantially horizontal plane, but restraining the cross frame from rocking in any vertical plane, and seating members pivotally connected to the end portion of the cross frame for swinging movement in a substantially vertical plane when the rear end portion of the boom is in a substantially horizontal position, each of said seating members having an upstanding marginal wall forming means for preventing a spring seat of the automobile from falling off the seating member.

GUY S. THOMPSON.